Figure 1:
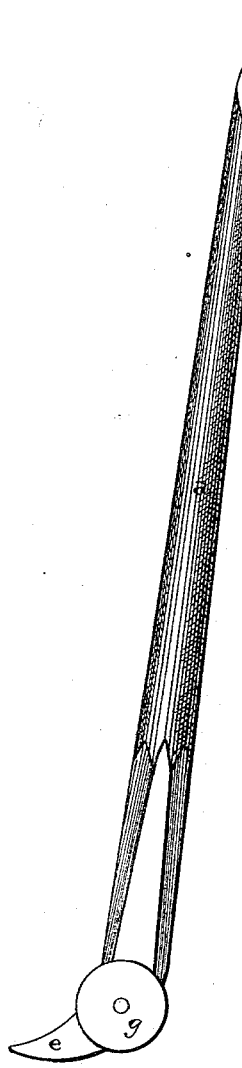
Figure 2:
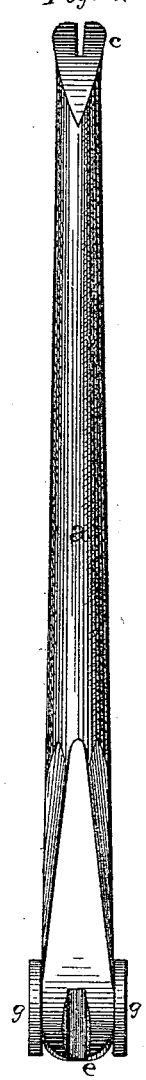

E. BUELL.
Spike-Extractors.

No. 148,664.            Patented March 17, 1874.

WITNESSES.
Wm Johnson
Jno. D. Patten

INVENTOR.
Eckford Buell
per
F. A. Lehmann, Atty.

UNITED STATES PATENT OFFICE.

ECKFORD BUELL, OF COLUMBUS, OHIO, ASSIGNOR OF ONE-HALF HIS RIGHT TO EBENEZER SPRAGUE, OF SAME PLACE.

IMPROVEMENT IN SPIKE-EXTRACTORS.

Specification forming part of Letters Patent No. 148,664, dated March 17, 1874; application filed September 13, 1873.

*To all whom it may concern:*

Be it known that I, ECKFORD BUELL, of Columbus, in the county of Franklin and State of Ohio, have invented certain new and useful Improvements in Nail and Spike Extractors; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in nail and spike extractors; and it consists in pivoting to the lower end of the bar one or more wheels, which serve the twofold purpose of a purchase for the bar in drawing spikes, and to enable the end to be moved back and forth more readily, as will be more fully described hereafter.

The accompanying drawings represent my invention.

$a$ represents an ordinary iron bar, having a claw, $c$, formed on its upper end, which is designed to be used in starting the spike when its head is too deeply embedded to allow the larger claw $e$ upon the lower end to grapple firmly with it, or where the head is partially concealed by the old-fashioned chair. Pivoted to each side of the bar, at a suitable distance from the lower end, is a wheel, $g$, the lower edges of which project down below the bottom of the bar, and serve both as a purchase to the bar in drawing a spike, and to enable the end to be moved back and forth more readily. The pivots or journals upon which the wheels turn may either be formed upon the side of the bar, at the point where it curves upward, or they may consist of a bolt which is passed through the end of the bar.

If so desired, a single wheel may be used instead of two, which will be pivoted in a suitable recess formed in the under side of the bar. The end of the bar is so formed that in drawing the spike the purchase is gradual, and when it comes upon the wheels, they give the end of the bar a forward and upward movement, thereby drawing the spike out straight and ready to be driven in again, as well as enabling the operator to work more easily and rapidly than with the bars now in use.

I am aware of the patent to Jacob Edson, January 21, 1868, and disclaim such.

Having thus described my invention, I claim—

The claw-bar $a$, provided with wheels $g$, which are attached directly to its end, substantially as shown and described.

In testimony that I claim the foregoing I have hereunto set my hand this 2d day of September, 1873.

ECKFORD BUELL.

Witnesses:
E. SPRAGUE,
W. J. SPRAGUE.